United States Patent
Lee

(10) Patent No.: US 6,219,828 B1
(45) Date of Patent: Apr. 17, 2001

(54) METHOD FOR USING TWO COPIES OF OPEN FIRMWARE FOR SELF DEBUG CAPABILITY

(75) Inventor: Van Hoa Lee, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,129

(22) Filed: Sep. 30, 1998

(51) Int. Cl.$^7$ ............... G06F 9/45; G06F 9/445
(52) U.S. Cl. .................. 717/4; 713/2; 714/30; 714/100; 711/102; 711/103; 711/104
(58) Field of Search .............. 717/4, 5, 7; 712/200, 712/227; 700/26, 1; 709/310, 321; 714/30, 100; 711/102, 103, 104; 713/2

(56) References Cited

U.S. PATENT DOCUMENTS

| | | | |
|---|---|---|---|
| 4,259,717 | * 3/1981 | Nakamura | 710/260 |
| 4,819,234 | * 4/1989 | Huber | 714/38 |
| 5,251,150 | * 10/1993 | Ladner et al | 702/127 |
| 5,404,526 | * 4/1995 | Dosch et al. | 714/30 |
| 5,475,860 | * 12/1995 | Ellison et al. | 709/212 |

(List continued on next page.)

FOREIGN PATENT DOCUMENTS

| | | | |
|---|---|---|---|
| 63-300330 | * 12/1988 | (JP) | G06F/11/28 |
| 01166143 | * 6/1989 | (JP) | G06F/11/28 |

(List continued on next page.)

OTHER PUBLICATIONS

IBM Corporation; "Advanced Functions for the Multi-Function Input/Output Processor Resident Debugger". IBM Technical Disclosure, vol. 32, iss 9B, pp 18–20, Feb. 1990.*

IBM Corporation; "Mechanism to Expedite Boot–time Debugging". IBM Technical Disclosure, vol. 38, iss 5, pp 571–574, May, 1995*

IBM Corporation; "Swap Master Processor during Open-Firmware Execution in an Symmetrical Multi–Processor RS/6000 Machine". IBM Technical Disclosure, vol. 39, iss 8, pp 9–10, Aug. 1996.*

IBM Corporation; "64 Bit PowerPC Comon Hardware Reference Platform System with Modified 32Bit PowerPC Common Hardware Reference Platform Open Firmware". IBM Technical Disclosure, vol. 39, iss 12, pp 225–228, Dec. 1996.*

(List continued on next page.)

*Primary Examiner*—Mark R. Powell
*Assistant Examiner*—Kelvin E. Booker
(74) *Attorney, Agent, or Firm*—Leslie A. VanLeeuwen; Felsman, Bradley, Vaden, Gunter & Dillon, LLP

(57) ABSTRACT

A first copy of Open Firmware is loaded into system memory to supply a debug function and a second copy of the same firmware is then loaded to provide functional code which is to be debugged. The first copy of Open Firmware in system memory is designated as the resident debugging function. Kernel code, within the first copy, sets up an executing environment for the debugger, such as system exception handlers and debug console enablement. Normal Open Firmware configuration variables are retrieved from Non-Volatile Random Access Memory ("NVRAM") by the first copy and transmitted to the loader. The second copy of Open Firmware is loaded into system memory to a location specified by the configuration variables. The second copy firmware image is designated as a normal Open Firmware operation in the system. The second copy initially takes over all system exception handlers except instruction breakpoint exception, program interrupt exception and trace exception. The instruction breakpoint exception is utilized to invoke the first copy, or resident debugger, from the normal Open Firmware (second copy) image during code debugging. The two copy debugging configuration is utilized in conjunction with an online machine language assembler and disassembler.

17 Claims, 4 Drawing Sheets

U.S. PATENT DOCUMENTS

| | | | |
|---|---|---|---|
| 5,548,794 | * 8/1996 | Yishay et al. | 711/211 |
| 5,568,641 | * 10/1996 | Nelson et al. | 713/2 |
| 5,600,784 | * 2/1997 | Bissett et al. | 709/400 |
| 5,603,033 | * 2/1997 | Joannin | 717/4 |
| 5,630,076 | * 5/1997 | Saulpaugh et al. | 709/21 |
| 5,701,487 | * 12/1997 | Arbouzov | 717/4 |
| 5,706,472 | * 1/1998 | Ruff et al. | 711/173 |
| 5,859,993 | * 1/1999 | Snyder | 712/208 |
| 5,918,194 | * 6/1999 | Banaska et al. | 702/91 |
| 5,930,831 | * 7/1999 | Marsh et al. | 711/173 |
| 5,958,049 | * 9/1999 | Mealey et al. | 709/321 |
| 5,963,741 | * 10/1999 | Horikawa | 717/4 |
| 5,968,136 | * 10/1999 | Saulpaugh et al. | 709/312 |
| 5,978,912 | * 11/1999 | Ravavy et al. | 713/2 |
| 5,983,017 | * 11/1999 | Kemp et al. | 717/4 |

FOREIGN PATENT DOCUMENTS

| | | | |
|---|---|---|---|
| 01166144 | * 6/1989 | (JP) | G06F/11/28 |
| 01292445 | * 11/1989 | (JP) | G06F/11/28 |
| 02001340 | * 1/1990 | (JP) | G06F/11/28 |
| 04182840 | * 6/1992 | (JP) | G06F/11/28 |
| 02184935 | * 7/1992 | (JP) | G06F/11/28 |
| 08171501 | * 7/1992 | (JP) | G06F/11/28 |

OTHER PUBLICATIONS

IBM Corporation; "Invoking a Resident Program From the Keyboard of the IBM Personal Computer". IBM Technical Disclosure, doc# AT8840577, pp 7272, May 1985.*

IBM Corporation; "Resident Debug Program for Multi–Function Input/Output Processor Microcode Problem Analysis". IBM Technical Disclosure, vol. 32, iss 9B, pp 10–12, Feb. 1990.*

Iyengar et al.; "An event–based retargetable debugger". Hewlett–Packard Journal, v45, n6, p33–45, Dec. 1994.*

Bus Architecture Standards Committee of the IEEE Computer Society, USA; "IEEE standard for boot (initialization configuration) firmware: core requirements and practices". IEEE, New York, NY, IEEE Std 1275–1994, Oct. 1994.*

IBM Corporation; "Use of verifiable virtual memory accesses for inter–processor surveilance". IBM Technical Disclosure Bulletin, v40, n7, p163, Jul. 1997.*

Nixon et al.; "A microarchitecture description language for retargeting firmware tools". IEEE/IEE Electronic Library [online], Proceedings of the 19th annual workshop on microprogramming, p34–43, Oct. 1986.*

* cited by examiner

METHOD FOR USING TWO COPIES OF OPEN FIRMWARE FOR SELF DEBUG CAPABILITY

BACKGROUND OF THE INVENTION

1. Technical Field

The present invention relates in general to controlling a data processing system after startup, but before control is passed to the main operating system and in particular to use of an Open Firmware user interface as a debugging tool.

Still more particularly, the present invention relates to debugging an Open Firmware boot routine before the main operating system is installed.

2. Description of the Related Art

In most data processing systems (or computers), a Basic Input Output System ("BIOS") is required at startup. BIOS is essential microcode that tests computer hardware at startup, hands over operation to the main operating system and handles data transfer between hardware devices in the data processing system. The BIOS is generally stored in non-volatile, read-only memory ("ROM") so that it may be executed when the system is turned on. The combination of the stored microcode and hardware is termed "firmware." Instructions, generally low level assembly code, are written in code as software and stored into ROM memory which then becomes part of the hardware in the computer.

Developers of "boot" microcode (microcode utilized to start a data processing system) usually employ both hardware and software tools to debug newly developed code.

Generally, the code language contains, or makes available, a specific debugger to correct errors in the new code. Errors may occur when the new code is loaded onto memory and at startup there may not be enough information available to diagnose and fix the problem.

Boot "firmware" is ROM based software that is automatically run when a data processing system is switched on. A primary function of boot firmware is to perform a few basic hardware tests, then load and execute (boot) the primary operating system. A secondary function included in the boot firmware is providing tools for debugging faulty hardware or software.

"Open Firmware" is a non-proprietary standard for boot firmware that is usable on different processors and buses and the terms Open Firmware and boot firmware will be utilized interchangeably. Open firmware is firmware that complies with IEEE Standard 1275-1990 and provides an interface independent of processor types. This allows a peripheral device added to the data processing system, to identify itself and supply a boot driver that will allow the device to be utilized on any system. Boot firmware conforming to IEEE Standard 1275-1990 also includes a user interface with debugging capabilities that allows operating systems and system loaders to utilize boot firmware to assist in a system configuration and initialization process.

IEEE Standard 1275-1990 also specifies a processor independent mechanism by which a system can interrogate and configure expansion devices and install device drivers.

In a firmware environment, boot firmware encodes drivers in a machine-independent language called Fcode, a byte-coded intermediate language for the Forth programming language. Forth is based on a stack-oriented "virtual machine" that may be implemented on virtually any computer and when testing newly developed Forth code, an existing Forth code debugger is utilized to resolve errors. Using Fcode, the boot process builds a device tree, which is a hierarchical data structure describing the system hardware.

Plug-in devices describe their own characteristics with Fcode and the characteristics are stored in the device tree.

Fcode drivers are compiled into system RAM for later execution and may be utilized on data processing systems with different processor types. When a boot firmware image (a copy of ROM based boot firmware) is loaded into system memory, the boot firmware interpreter evaluates and expands boot firmware byte code into machine codes. During the execution of the expansion from Fcode into machine codes, errors can occur due to new codes being added or a new device with Fcode being probed. These errors cause the Boot firmware to take exceptions and halt the system. Generally, there is not enough information to debug these errors. Most of the time, developers need to rely on hardware debug tools to resolve errors.

FIG. 3 depicts a high-level flow chart describing the boot process, utilizing Open Firmware, as is known in the prior art. The process begins with step 300, which depicts power being turned on. The process continues to step 302, which illustrates a loader within the boot firmware loading or copying the boot routine, in this case Open Firmware, into system memory. The process next passes to step 304, which depicts the processor executing the boot routine that has been copied into system memory. The process then proceeds to step 306 which illustrates the processor executing the Forth interpreter. The process next passes to step 308, which depicts the full Open Firmware image (copy) executing.

The process passes to step 310, which illustrates Open Firmware exploring the system bus for devices. The process next proceeds to step 312, which depicts Open Firmware building a device-tree by loading device drivers of system components (buses, plug-in devices, etc.) into system memory. This device tree represents physical connections between devices and may be utilized by the operating system to configure itself, locate particular devices, attach device drivers and so on.

The process next passes to step 314, which depicts Open Firmware creating an execution environment (typically utilizing a Forth language compliant kernel) and loading the primary operating system to memory. At this point the primary operating system can utilize the Open Firmware drivers or it can load its own drivers and erase the boot image from memory. The process then continues to step 316, which illustrates the operating system taking control of the data processing system.

Low level firmware debug is a very difficult and a common problem for the computer industry as a whole, often requiring hardware assistance. Generally, boot firmware has an interpreter that provides a set of programmable debugging features to allow system problems to be isolated in the event of failure.

It would be desirable therefore, to provide a debugging tool to debug the above mentioned errors during Boot firmware execution. Additionally, it would be desirable to maintain a firmware debugger in the system which may help to resolve errors when testing newly developed Boot firmware Forth code.

SUMMARY OF THE INVENTION

It is therefore one object of the present invention to provide a debugging tool that would remain resident in memory.

It is another object of the present invention to allow the debugging tool to be invoked by the boot firmware developer.

It is yet another object of the present invention to complement an existing Forth code debugger when testing newly developed boot firmware Forth code. The foregoing objects are achieved as is now described.

A first copy of Open Firmware is loaded into system memory to supply a debug function and a second copy of the same firmware is then loaded to provide functional code that is to be debugged. The first copy firmware image in system memory is designated as the resident debugging function.

Kernel code, within the image, sets up an executing environment for the debugger, such as system exception handlers and debug console enablement. Normal Open Firmware configuration variables are retrieved from Non-Volatile Random Access Memory ("NVRAM") by the first copy and transmitted to the loader. The second copy of Open Firmware is loaded into system memory to the location specified by the configuration variables. The second copy firmware image is designated as a normal Open Firmware operation in the system. The second copy initially takes over all system exception handlers except instruction breakpoint exception, program interrupt exception and trace exception. The instruction breakpoint exception is utilized to invoke the first copy, or resident debugger, from the normal Open Firmware image during code debugging processes. The two copy debugging configuration is utilized in conjunction with an online machine language assembler and disassembler.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
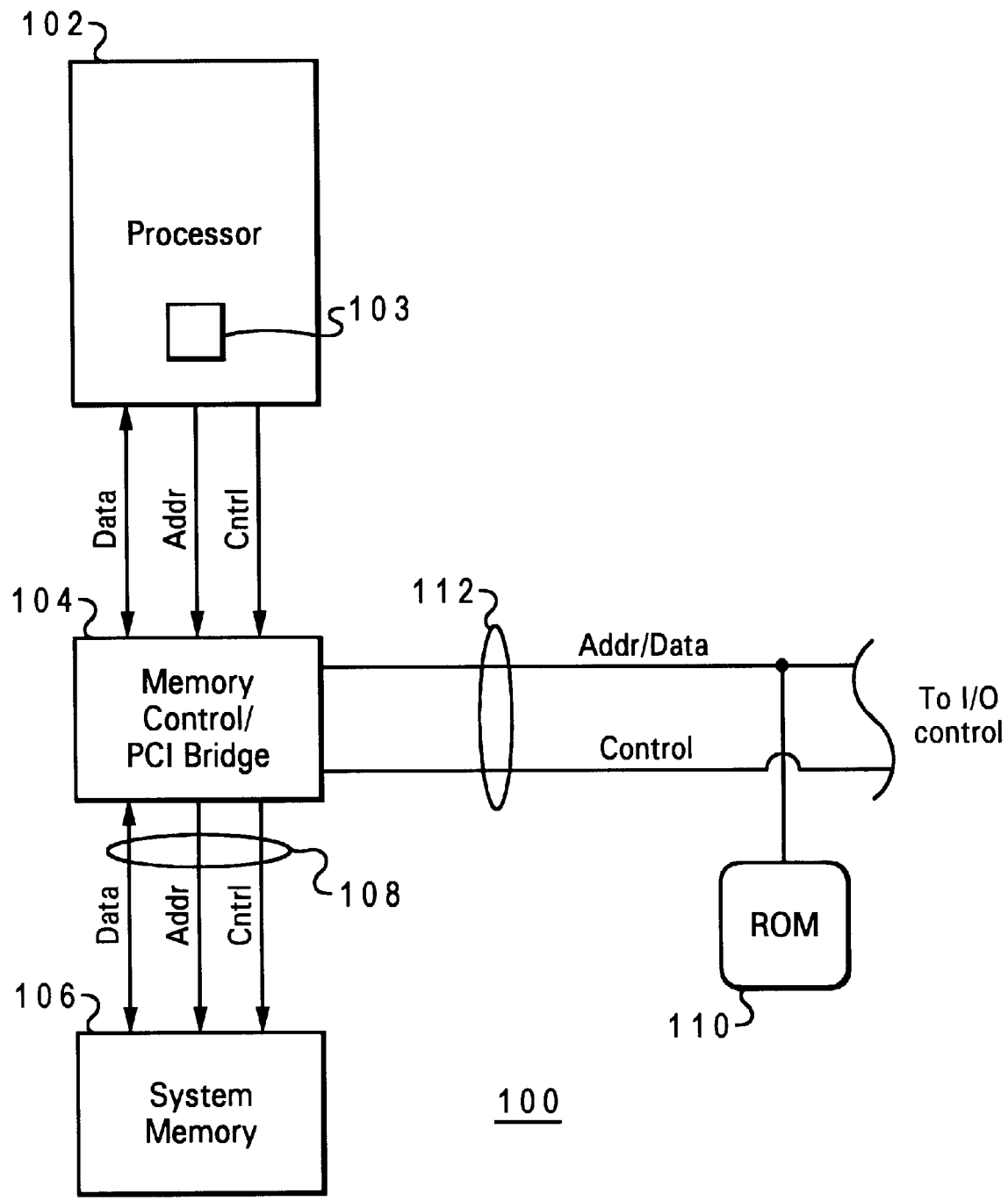
FIG. 1 depicts a high-level block diagram of a selected portion of a computer in which a preferred embodiment of the present invention may be implemented.

With reference now to the figures, and in particular with reference to FIG. 1, a high-level block diagram of a selected portion of a computer in which a preferred embodiment of the present invention may be implemented, is depicted. The relevant portion of Computer 100 is illustrated and includes processor 102, Memory Control/PCI Bridge 104, System Memory 106 all interconnected via System Bus 108. Read Only Memory (ROM) 110 is connected to Memory Control/PCI Bridge 104 and Processor 102 via Address/Data Bus 112 and System Bus 108. Boot software is loaded into ROM 110 through I/O Control. ROM 110 is non-volatile memory and retains the boot software, even in the absence of system power, so that it may be copied from ROM 110 into system memory for execution at startup or reset. The combination of pre-loaded software into ROM 110 is termed "firmware." Boot firmware controls the computer from startup until control is handed over to the primary operating system. A primary function of the boot firmware is to initialize the hardware and boot the primary operating system. Additional functions include testing hardware and providing software tools for debugging error in case of faulty hardware or software.

The data processing system 100, employing the present invention, loads Open Firmware when powered on and ordinarily initializes hardware and performs various routines before booting the primary operating system. In the present invention, a first copy of Open Firmware is loaded from ROM 110 into system memory 106. A flag is placed in register 103, to identify the first copy as a resident debugger and the first copy will be used as a debugger during startup. A kernel within the first copy sets up an operating environment by providing operators used to implement drivers and interfaces of the Open Firmware system.

The first copy retrieves configuration variables from system memory and returns them to a loader within the first copy. A second copy of Open Firmware is then loaded into system memory 106 and takes over the system with the exception of three exception handlers which are controlled by the first copy. The second copy operates normally and may employ the first copy as a resident debugger, complementing the Forth language debugging tool provided within Open Firmware itself. The second copy of Open Firmware completes the debugging process, utilizing the first copy, and boots the primary operating system if no failures occur.

Figure 2:
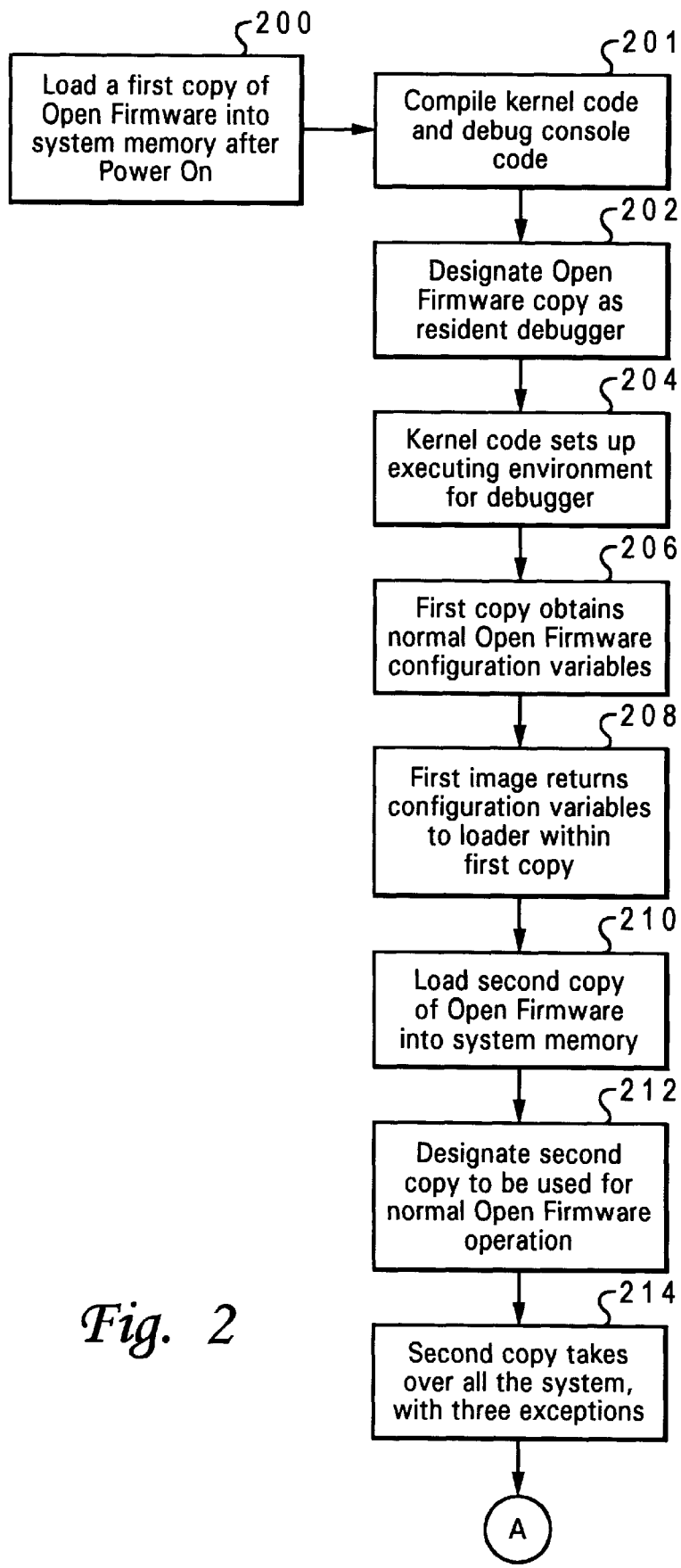
FIG. 2 is a high-level flow chart of the process for using two copies of Open Firmware for self-debugging in accordance with a preferred embodiment of the present invention.

Referring to FIG. 2, a high-level flow chart of the process for using two copies of Open Firmware for self-debugging, in accordance with a preferred embodiment of the present invention, is illustrated. The process begins with step 200, which depicts a loader within the first copy of Open Firmware loading a first copy (image) of Open Firmware (having been pre-loaded into ROM) from ROM memory into system memory to the image's operating location. As the first copy is loaded, a flag is placed in a processor register to identify the first copy as a resident debugger. When the second copy is loaded, Open Firmware checks the status of the register to determine if it will be a resident debugger or operate normally. The process then passes to step 201, which illustrates kernel code and debug console code being compiled so that at the earliest time during startup, the kernel code is executed and the debug console is available for subsequent codes. The debug console is normally a TTY (Teletypewriter) terminal attached to the first built-in serial port of the system.

The process continues to step 202, which depicts designation of the first copy of Open Firmware image in the system memory as the resident debugger. The first copy gains control and sets flags in a processor register within the computer. The register sends an argument to a second copy to indicate whether the first copy is a resident debugger or a normal firmware image. The process continues to step 204, which illustrates the kernel code for the debugger within the image (copy) in system memory setting up the executing environment for the debugger such as system exception handlers and debug console enablement. The process next passes to step 206, which depicts the first image setting up a method to access NVRAM so Open Firmware may retrieve configuration variables. The configuration variables are returned to the built-in loader in boot firmware. The process then proceeds to step 208, which illustrates the first copy (image) returning the configuration variables from system memory to the firmware loader. The variables retrieved include Real-Base, Real-Size, Virt-base, Virt-size, etc., which defines memory and/or virtual address space for the firmware's own use.

The process then passes to step 210, which depicts the second copy of Open (boot) Firmware being loaded into system memory at the location specified by the configuration variables. The process proceeds to step 212, which illustrates designating the second copy to be utilized for normal Open Firmware operation of the system. As indicated above the second copy queries the register containing the flags installed by the first copy and determines that a first copy is installed as a debugger thereby designating by default the second copy for normal operation. The process then continues to step 214, which depicts the second copy completing its establishment and taking over all the system exception handlers except instruction breakpoint exception, program interrupt exception and trace exception. The process then proceeds to step 216 which is described in FIG. 2A.

Figure 2A:
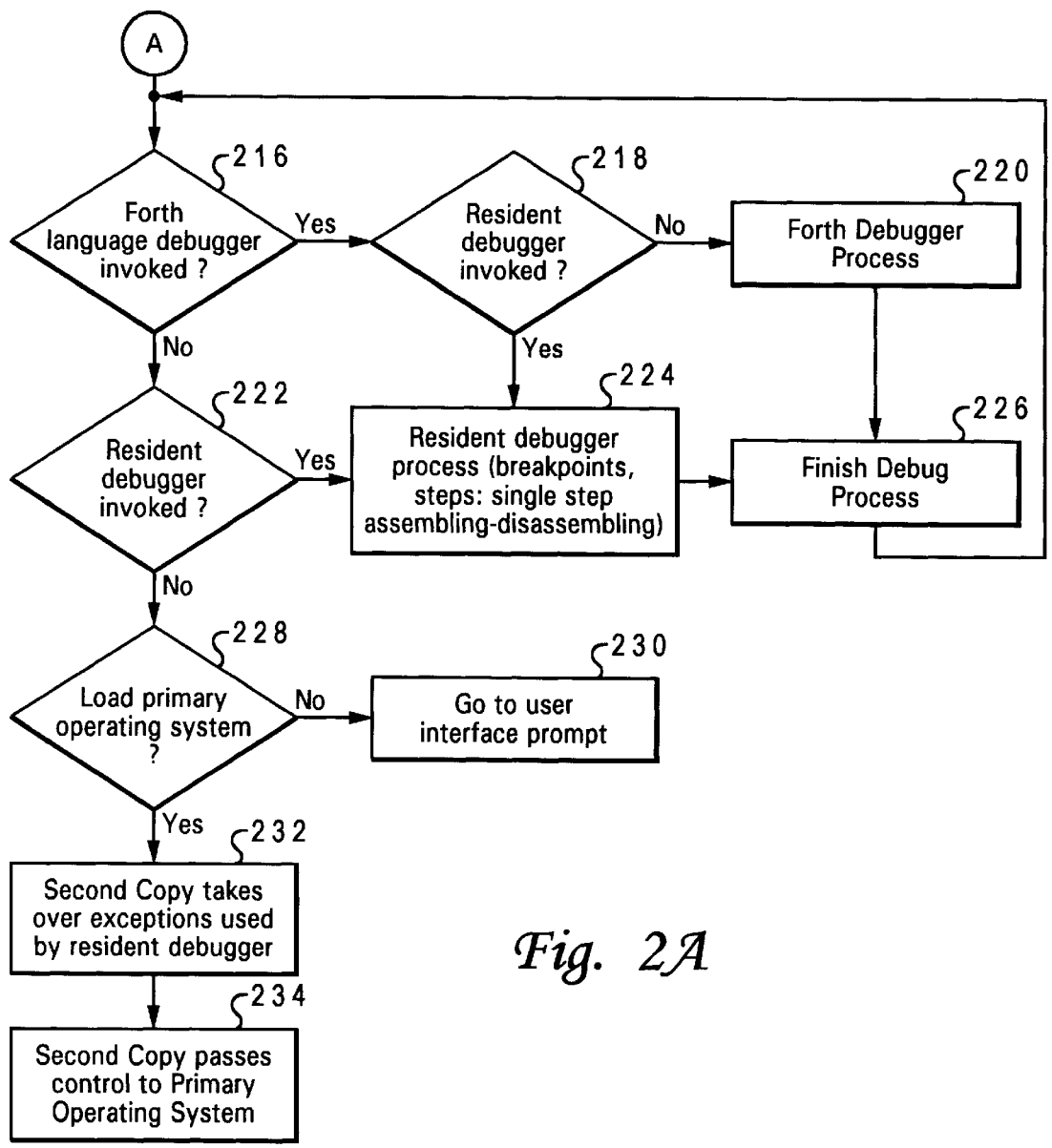
FIG. 2A depicts a continuation of the flow chart illustrated in FIG. 2 employing a second copy of Open Firmware for debugging and interfacing with the operating system in accordance with a preferred embodiment of the present invention.
Figure 3:
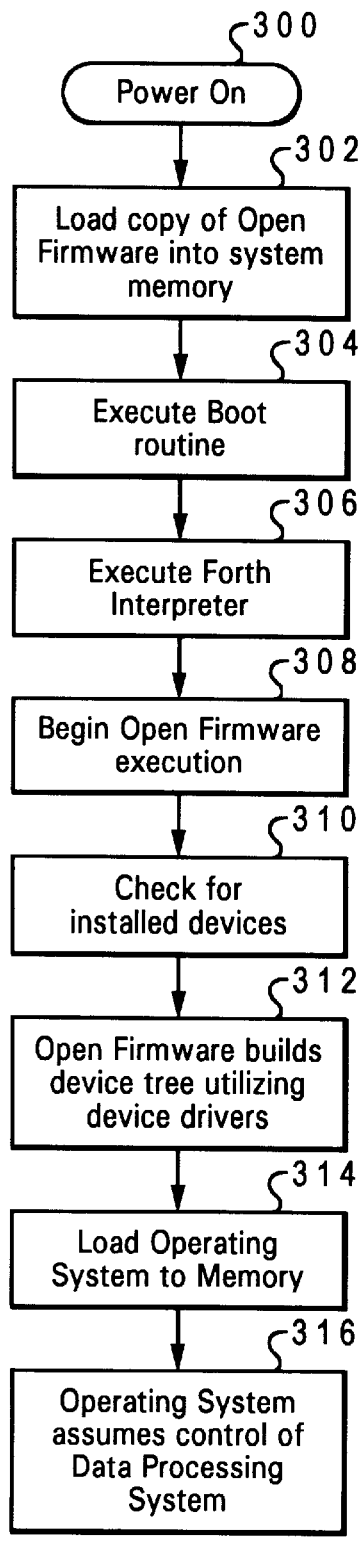
FIG. 3 depicts a high-level flow chart of a boot process utilizing Open Firmware.

Referring now to FIG. 2A, a continuation of the flow chart illustrated in FIG. 2 employing a second copy of Open Firmware for debugging and interfacing with the operating system in accordance with a preferred embodiment of the present invention, is depicted. The process continues from step 214 to step 216, which depicts a determination of whether the Forth language debugger will be invoked. If it is invoked the process passes to step 218, which illustrates a determination of whether the resident debugger (Open Firmware debugger) is invoked. If it is not invoked, the process proceeds to step 220, which depicts the Forth debugger debugging errors. The process next passes to step 226, which illustrates completion of the Forth language debugging process. The process then returns to step 216.

If, in step 218, the resident debugger is invoked, the process continues instead to step 224, which depicts the Open Firmware debugger (first copy), utilizing an assembler/disassembler, proceeding with debugging by setting breakpoints and single-stepping through the second copy. The process then passes to step 226 and on to step 216. Returning to step 216, if the Forth language debugger is not invoked, the process instead proceeds to step 222, which illustrates a determination of whether the resident debugger needs to be invoked. If the resident debugger is invoked, the process proceeds to step 224 and 226 where the debugging process is accomplished. If the resident debugger is not invoked in step 222, the debugging process is complete or there is no debugging required, the process passes instead to step 228, which depicts a determination of whether primary operating system needs to be loaded.

If the user chooses to interrupt the process and prevent loading of the primary operating system, the process proceeds to step 230, which illustrates the user receiving confirmation of interruption of the process utilizing an interface prompt on the user's display. Returning to step 232, if the user chooses not to interrupt, the process passes instead to step 232, which illustrates the second copy of Open Firmware assuming control of the exceptions that were utilized by the first copy, or the resident debugger. The process then passes to step 234, which depicts the second copy of Open Firmware passing control to the primary operating system.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for debugging firmware in a data processing system, comprising the steps of:

loading a first copy of said firmware into a system memory;

designating said first copy as a resident debugger;

loading a second copy of said firmware into said system memory;

designating said second copy to be utilized for normal firmware operation; and utilizing debug functions in said first copy of firmware to debug said data processing system during startup.

2. The method of claim 1, wherein said firmware has intrinsic error debug capabilities utilized for debugging said data processing system during startup.

3. The method of claim 1, wherein loading said first copy of said firmware into a system memory, further comprises:

setting up an executing environment for said resident debugger;

obtaining one or more configuration variables from a memory;

returning said configuration variables to a loader contained within said first copy; and loading a second copy of said firmware into said system memory, at a location determined by said configuration variables, to be employed for normal firmware operation.

4. The method of claim 1, wherein loading said second copy of said firmware into said system memory, further comprises:

invoking said resident debugger formed by said first copy; and debugging selected components of said data processing system software and hardware.

5. The method of claim 1, wherein designating said second copy of said firmware to be utilized for normal firmware operation, further comprises:

completing establishment of said second copy as said normal firmware operation;

said second copy taking control of all exception handlers utilized by said resident debugger excluding breakpoint exception, program interrupt exception and trace exception; and utilizing said first copy to debug said second copy.

6. The method of claim 5, further comprises:

loading a primary operating system;

taking control of all exception handlers utilized by said resident debugger; and passing control to said primary operating system.

7. A data processing system for debugging firmware in a data processing system, comprising:
   means for loading a first copy of said firmware into a system memory;
   means for designating said first copy as a resident debugger;
   means for loading a second copy of said firmware into said system memory;
   means for designating said second copy to be utilized for normal firmware operation; and
   an error debug function in said first copy of firmware for debugging said data processing system during startup.

8. The system of claim 7, wherein means for loading said first copy of said firmware into a system memory further comprises:
   means for setting up an executing environment for said resident debugger;
   means for obtaining one or more configuration variables from a memory for said firmware;
   means for returning said configuration variables to a loader contained within said first copy; and
   means for loading a second copy of said firmware into system memory, at a location determined by said configuration variables, to be employed for normal firmware operation.

9. The system of claim 7, wherein means for loading said second copy into said system memory, further comprises:
   means for invoking said resident debugger; and
   means for debugging selected components of said data processing system software and hardware.

10. The system of claim 7, wherein means for designating said second copy of said firmware to be utilized for normal firmware operation, further comprises:
    means for completing establishment of said second copy as said normal firmware operation;
    means for second copy taking control of all exception handlers utilized by said resident debugger excluding breakpoint exception, program interrupt exception and trace exception; and
    means for utilizing said first copy to debug said second copy.

11. The system of claim 7, further comprises:
    means for loading a primary operating system;
    means for taking control of all exception handlers utilized by said resident debugger; and
    means for passing control to said primary operating system.

12. A computer program product within a computer-readable medium for debugging firmware in a data processing system, comprising:
    instructions within said computer-readable medium for loading a first copy of said firmware into a system memory;
    instructions within said computer-readable medium for designating said first copy of said firmware as a resident debugger;
    instructions within said computer-readable medium for loading a second copy of said firmware into said system memory; and
    instructions within said computer-readable medium for designating said second copy to be utilized for normal firmware operation; and
    instructions within said computer-readable medium for utilizing debug functions in said first copy of firmware to debug said data processing system during startup.

13. The computer program product of claim 12, wherein said firmware having instructions providing debug capabilities.

14. The computer program product of claim 12, wherein loading said first copy of said firmware into a system memory, further comprises:
    instructions within said computer-readable medium for setting up an executing environment for said resident debugger;
    instructions within said computer-readable medium for obtaining one or more configuration variables from a memory;
    instructions within said computer-readable medium for returning said configuration variables to a loader contained within said first copy; and
    instructions within said computer-readable medium for loading a second copy of said firmware into said system memory, at a location determined by said configuration variables, to be employed for normal firmware operation.

15. The computer program product of claim 12, wherein instructions for loading said second copy of said firmware into said system memory, further comprises:
    instructions within said computer-readable medium for invoking said resident debugger formed by said first copy; and
    instructions within said computer-readable medium for debugging selected components of said data processing system software and hardware.

16. The computer program product of claim 10, wherein instructions for designating said second copy of said firmware to be utilized for normal firmware operation, further comprises:
    instructions within said computer-readable medium for completing establishment of said second copy as said normal firmware operation;
    instructions within said computer-readable medium for said second copy to control all exception handlers utilized by resident debugger excluding breakpoint exception, program interrupt exception and trace exception; and
    instructions within said computer-readable medium for utilizing said first copy to debug said second copy.

17. The computer program product of claim 14, further comprises;
    instructions within said computer-readable medium for loading a primary operating system;
    instructions within said computer-readable medium for taking control of all exception handlers utilized by said resident debugger; and
    instructions within said computer-readable medium for passing control to said primary operating system.

* * * * *